US009689708B2

(12) United States Patent
Girardey et al.

(10) Patent No.: US 9,689,708 B2
(45) Date of Patent: Jun. 27, 2017

(54) MEASURING METHOD FOR A MEASURED VARIABLE DEPENDENT ON AUXILIARY MEASURED VARIABLES

(75) Inventors: Romuald Girardey, Huningue (FR); Roland Dieterle, Pfaffenhofen (DE); Marc Schlachter, Wehr (DE)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 1014 days.

(21) Appl. No.: 13/812,160

(22) PCT Filed: Jun. 20, 2011

(86) PCT No.: PCT/EP2011/060197
§ 371 (c)(1),
(2), (4) Date: Jan. 25, 2013

(87) PCT Pub. No.: WO2012/013423
PCT Pub. Date: Feb. 2, 2012

(65) Prior Publication Data
US 2013/0124143 A1    May 16, 2013

(30) Foreign Application Priority Data
Jul. 28, 2010  (DE) .................. 10 2010 038 573

(51) Int. Cl.
*G01D 1/14*    (2006.01)
*G01F 1/34*    (2006.01)
(Continued)

(52) U.S. Cl.
CPC .............. *G01D 1/14* (2013.01); *G01F 1/34* (2013.01); *G01L 15/00* (2013.01); *G04F 13/00* (2013.01); *G06F 15/00* (2013.01)

(58) Field of Classification Search
CPC ........... G06F 19/00; G01R 23/02; G01R 1/00; G05B 1/00
(Continued)

(56) References Cited

U.S. PATENT DOCUMENTS 4,230,991 A  * 10/1980  Paphitis ................. G01R 23/02
                                                              324/76.39
4,720,806 A  *  1/1988  Schippers et al. ............ 702/187
(Continued)

FOREIGN PATENT DOCUMENTS

DE              44 07 571 A1    9/1995
DE     10 2005 026 826 A1   12/2006
(Continued)

OTHER PUBLICATIONS

Ning Xu et al., "A Wireless sensor network for structural monitoring," Proceedings of the 2nd International Conference on Embedded Networked Sensor Systems, Sensys '04, Jan. 1, 2004, p. 13, XP55008158, New York, New York, USA.
(Continued)

*Primary Examiner* — John Breene
*Assistant Examiner* — Jeffrey Aiello
(74) *Attorney, Agent, or Firm* — Bacon & Thomas, PLLC (57) ABSTRACT

A method for determining a value of a measured variable, which is a function of a first auxiliary measured variable and at least a second auxiliary measured variable, comprising: registering and providing a sequence of measured values of the first auxiliary measured variable over at least a first time range; providing a value of the second auxiliary measured variable, wherein the point in time of registering the provided value lies in the first time range; selecting a value of the first auxiliary measured variable from the sequence of measured values of the first auxiliary measured variable as a function of information concerning point in time of
(Continued)

registering the provided value of the second auxiliary measured variable; and ascertaining a value of the measured variable as a function of the selected value of the first auxiliary measured variable and the value of the second auxiliary measured variable.

17 Claims, 5 Drawing Sheets (51) Int. Cl.
*G01L 15/00* (2006.01)
*G04F 13/00* (2006.01)
*G06F 15/00* (2006.01)

(58) Field of Classification Search
USPC .......... 324/640, 657, 72; 702/138, 189, 183
See application file for complete search history.

(56) References Cited

U.S. PATENT DOCUMENTS

| | | | | |
|---|---|---|---|---|
| 4,856,325 | A * | 8/1989 | Tomita et al. | 73/150 A |
| 4,985,859 | A * | 1/1991 | Rauner | G01R 23/10 |
| | | | | 324/166 |
| 6,167,690 | B1 * | 1/2001 | Hepner et al. | 60/773 |
| 6,609,079 | B1 * | 8/2003 | Seitlinger | 702/136 |
| 8,311,651 | B2 * | 11/2012 | Spanke et al. | 700/19 |
| 2002/0029130 | A1 * | 3/2002 | Eryurek et al. | 702/183 |
| 2007/0208983 | A1 * | 9/2007 | Sudhakar et al. | 714/732 |
| 2007/0288213 | A1 * | 12/2007 | Schantl et al. | 703/8 |
| 2008/0147336 | A1 * | 6/2008 | Karbula | G01D 9/005 |
| | | | | 702/64 |
| 2010/0042367 | A1 * | 2/2010 | Brown | 702/182 |
| 2011/0093212 | A1 * | 4/2011 | Herrmann et al. | 702/23 |
| 2011/0208440 | A1 | 8/2011 | Pechstein et al. | |
| 2012/0169059 | A1 * | 7/2012 | Beekmann | F03D 9/003 |
| | | | | 290/55 |
| 2012/0283993 | A1 * | 11/2012 | Schlachter et al. | 702/189 |
| 2013/0124143 | A1 * | 5/2013 | Girardey et al. | 702/176 |

FOREIGN PATENT DOCUMENTS

| | | |
|---|---|---|
| DE | 10 2005 046 319 A1 | 3/2007 |
| DE | 10 2007 030 700 A1 | 5/2009 |
| DE | 10 2008 053 920 A1 | 5/2010 |
| WO | 2007/036418 A1 | 4/2007 |
| WO | 2009/003963 A3 | 1/2009 |

OTHER PUBLICATIONS

International Preliminary Reports on Patentability dated Oct. 7, 2011 and mailed Feb. 7, 2013, issued in Geneva, Switzerland, in International Application No. PCT/EP2011/060197.
German Search Report dated Mar. 9, 2011, issued in Munich, Germany, in Application No. 10 2010 038 573.5.

* cited by examiner

MEASURING METHOD FOR A MEASURED VARIABLE DEPENDENT ON AUXILIARY MEASURED VARIABLES

TECHNICAL FIELD

The present invention relates to a measuring method for a measured variable dependent on auxiliary measured variables. Such a measured variable can be, for example, a relative pressure, wherein the auxiliary measured variables are an absolute process pressure and an absolute atmospheric pressure, whose difference must be formed.

BACKGROUND DISCUSSION

Orth et al. disclose in U.S. Pat. No. 6,907,790 B2 such a method for determining relative pressure, in the case of which a first absolute pressure measuring device measures a process pressure and a second absolute pressure measuring device measures an atmospheric pressure. The atmospheric pressure registered by the second measuring device is transmitted to the first measuring device, whereupon the first measuring device calculates the relative pressure. The atmospheric pressure can, in such case, be transmitted especially using the HART-multidrop method. For fill-level measurements, which, in the case of Orth et al., are clearly the main interest, it is, as a rule, not absolutely required that a measured value of the atmospheric pressure be obtained simultaneously with a measured value of the process pressure, since the atmospheric pressure usually changes only slowly. In case, however, processes with more dynamic parameters are to be monitor, deviations between the points in time of the registering of the different auxiliary measured variables, which enter into the determining of the measured variable, can cause considerable corruption of the measured variable to be determined.

SUMMARY OF THE INVENTION

It is, therefore, an object of the present invention to provide a method, which overcomes the disadvantages of the state of the art and enables a registering of auxiliary measured variables with minimal time deviation. The object is achieved by the method of the invention for determining a value of a measured variable, which is a function of a first auxiliary measured variable and at least a second auxiliary measured variable, includes steps as follows: Registering and providing a sequence of measured values of the first auxiliary measured variable over at least a first time range; providing a value of the second auxiliary measured variable, wherein the point in time of registering the provided value lies in the first time range; selecting a value of the first auxiliary measured variable from the sequence of measured values of the first auxiliary measured variable as a function of information concerning point in time of registering the provided value of the second auxiliary measured variable; and ascertaining a value of the measured variable as a function of the selected value of the first auxiliary measured variable and the value of the second auxiliary measured variable.

The method can especially be executed repeatedly, in order to output a sequence of measured values of the measured variable. This can occur, for example, with an average repetition frequency of several Hz up to 100 Hz.

The sequence of measured values of the first auxiliary measured variable can be measured especially with a repetition frequency, which amounts to at least twice, especially at least 4 times, preferably at least 8 times, further preferably at least 16 times and especially preferably at least 32 times an average repetition frequency, with which the method of the invention is repeated, or with which the measured values of the second auxiliary measured variable are provided.

The providing of the value of the second auxiliary measured variable can occur, according to an embodiment of the invention, for example, upon a demand that the value be provided.

For example, in the so-called burst mode of the HART protocol, the values of the second auxiliary measured variable can, however, be provided without special demand, essentially, for instance, periodically.

The registering of the value of the second auxiliary measured variable to be provided can, according to an embodiment of the invention, occur, for example, likewise upon demand that the value be provided.

In a further development of the invention, a sequence of values of the second auxiliary measured variable is registered independently of a demand signal, wherein, upon demand that a value of the second auxiliary measured variable be provided, the most up-to-date, available registered value of the sequence is provided.

Especially, a sequence of values of the second auxiliary measured variable can be registered with a repetition frequency, which corresponds to the repetition frequency for registering the values of the first auxiliary measured variable. This means, for example, that the repetition frequency for registering values of the second auxiliary measured variable deviates by not more than 5%, especially no more than 2% and preferably no more than 1% from the repetition frequency for registering the values of the first auxiliary measured variable.

In a further development of the invention, the value of the second auxiliary measured variable is provided together with information concerning point in time of registering the provided value of the second auxiliary measured variable.

In an embodiment of this further development of the invention, there is transmitted, together with the value of the second auxiliary measured variable, the value of a delay time, which has passed between registering of the value of the second auxiliary measured variable and the providing of the value of the second auxiliary measured variable.

In an embodiment of the invention, based on point in time of receipt of a data frame, with which the value of the second auxiliary measured variable is provided, and based on a delay time between registering of the value of the second auxiliary measured variable and the providing of the data frame, the point in time of the registering of the value of the second auxiliary measured variable is ascertained. The delay time can be, for example, the delay time provided with the measured value or it can be a predetermined delay time. A predetermined delay time is especially proper, when a constant delay time can be assumed, which corresponds to the predetermined delay time. The predetermined delay time can be transmitted, for example, once upon an initializing of the involved measuring devices and, in given cases, validated over greater time intervals.

In another embodiment of the invention, there is provided with the value of the second auxiliary measured variable a time signal, which expresses the point in time of the registering according to a system time of a measuring device, which registers and provides the value of the second auxiliary measured variable.

In a further development of this embodiment of the invention, the system time of the second measuring device is synchronized with the system time of a first measuring device, which registers the sequence of values of the first auxiliary measured variable. The synchronizing can occur, for example, by having the first measuring device request the system time of the second measuring device, which then transmits its system time to the first measuring device, and the first measuring device compares the system time of the second measuring device with its own system time and transmits a correction value for the system time of the second device to the second device, wherein the second measuring device corrects its system time using the transmitted correction value.

In a further development of the invention, repetition frequency of the registering of the sequence of values of the first auxiliary measured variable is a function of a clock signal of the first measuring device, wherein the clocking frequency of the first measuring device is variable in a range of variation of no more than 10%, especially no more than 5%, and wherein by variation of the clocking frequency the repetition frequency for registering the values of the first auxiliary measured variable is varied, in order to minimize a deviation between the point in time of the registering of the value of the first auxiliary measured variable to be selected in each case and the point in time of registering the provided value of the second auxiliary measured variable.

The maximum time separation between the selected value of the first measured variable and the provided value of the second auxiliary measured variable can be, for example, the reciprocal value of the repetition frequency, especially half the reciprocal value of the repetition frequency, of the first auxiliary measured variable. Half the reciprocal value of the repetition frequency can then occur as maximum time deviation, when actually that value of the first auxiliary measured variable is selected, which has the least time separation relative to the provided value of the second auxiliary measured variable, and, indeed, independently of which value was registered first. When always only the, in time, next following registering point in time is selected or always only the, in time, next preceding registering point in time, then the entire reciprocal value of the repetition frequency can occur as maximum time deviation.

By an especially temporary variation of the repetition frequency for registering the values of the first measured variable and fitting this repetition frequency to a repetition frequency for registering the values of the second measured variable, a phase difference between the points in time of registering the sequence of values of the first auxiliary measured variable and the points in time of registering the sequence of values of the second auxiliary measured variable can be minimized.

The provided values of the sequence of values of the first auxiliary measured variable can, according to a further development of the invention, be stored in a ring buffer.

In a further development of the invention, the values of the first auxiliary measured variable are registered by a first measuring device, wherein the values of the second auxiliary measured variable are registered by a second measuring device, wherein the first and the second field devices are connected with one another via a digital data communication means. In an embodiment of this further development of the invention the first measuring device and the second measuring devices communicate with one another via a HART protocol. The second measuring device can provide the value of the second auxiliary measured variable especially in the burst mode in a HART multidrop frame, which can also contain time information.

The measured variable can be, for example, a pressure difference between a first pressure and a second pressure wherein the first auxiliary measured variable is the first pressure and the second auxiliary measured variable is the second pressure.

A further development of the invention relates to a method for determining a value of a measured variable, which is a function of at least three auxiliary measured variables.

Such a method can be, for example, determining mass flow of a gas by means of pressure difference measurement and density determination. The auxiliary measured variables are, for this, in a first embodiment, a first absolute pressure of the gas in the case of a first flow cross section, a second absolute pressure of the gas in the case of a second flow cross section and the temperature of the gas. In a second embodiment, the auxiliary measured variables are an absolute pressure of the gas, a pressure difference of the gas between a first flow cross section and a second flow cross section and the temperature of the gas.

The auxiliary measured variables, which concern pressure, or pressure difference, are time critical in flow applications. In such case, the separation in time between registering of the measured values needed for evaluation is necessarily to be minimized. To the extent that also in the case of the temperature as third auxiliary measured variable rapid changes are to be expected, the values of the third auxiliary measured variable are to be provided in the same manner as the values of the second auxiliary measured variable, and their registering points in time taken into consideration.

Insofar as deviations between the points in time of registering of the provided values of the second and third auxiliary measured variable are to be expected, here, in given cases, a rule is to be established, according to which a value of the first auxiliary measured variable is to be selected. This can occur, for example, by forming a weighted average value of the points in time of registering of the second auxiliary measured variable and the third auxiliary measured variable.

In another embodiment of the method for determining a measured variable, which depends on three auxiliary measured variables, sequences of measured values for a first auxiliary measured variable and for a second auxiliary measured variable can be recorded, wherein a value of a third auxiliary measured variable is provided with information concerning point in time of the registering of the provided value, wherein based on the time information concerning point in time of registering the provided value of the third auxiliary measured variable, an appropriately timed value, especially the next value in time, is provided from the sequence of values of the second auxiliary measured variable, and wherein, added to this, an appropriately timed value, especially the next value in time is taken from the sequence of values of the first auxiliary measured variable, in order to determine a value of the measured variable based on the values of the first, second and third auxiliary measured variables.

Fundamentally, it holds for any measured variables, which depend on two or more auxiliary measured variables, that the values of those auxiliary measured variables, which are subject to strong dynamics, should, first of all, be registered near in time to one another and, secondly, they should be provided accompanied by information concerning point in time of their registering.

BRIEF DESCRIPTION OF THE DRAWINGS

The invention will now be explained based on the examples of embodiments presented in the drawing, the figures of which show as follows.

DETAILED DISCUSSION IN CONJUNCTION WITH THE DRAWINGS

Figure 1:
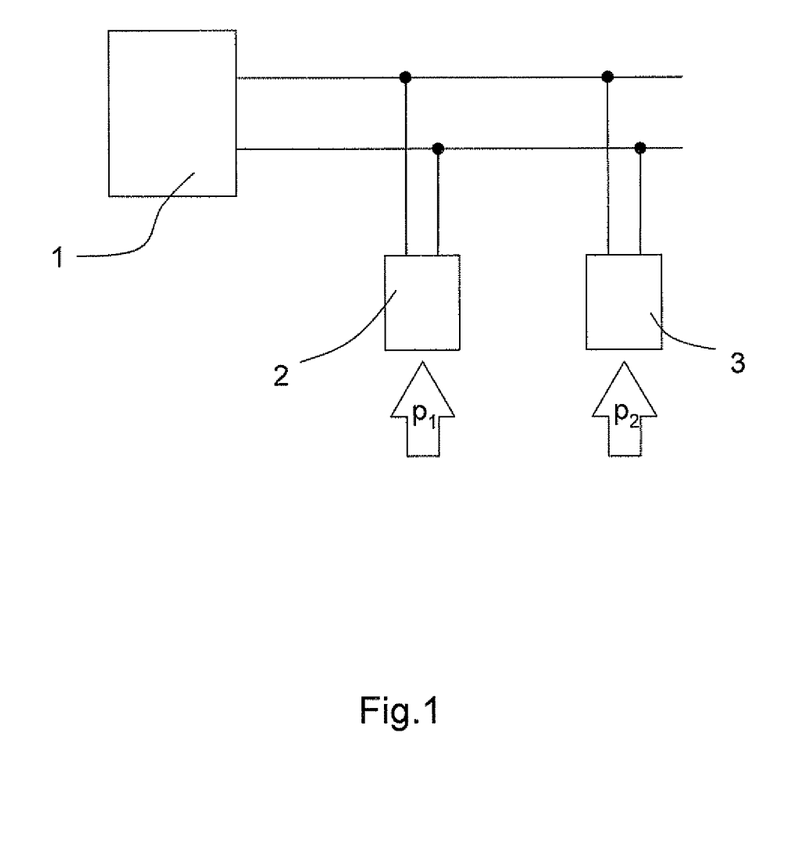
FIG. 1 is a schematic arrangement of measuring devices for performing the method of the invention.

The apparatus shown in FIG. 1 comprises a controlled system having a control unit 1, to which are connected, via a two wire loop, at least a first measuring device 2 and a second measuring device 3. The measuring devices are supplied with energy by the control unit via the two wire loop. The devices communicate with one another via the HART protocol, wherein the first device 2 operates not in the burst-mode, and the second device 3 is operated in the burst-mode. The measuring rate of the first device 2, thus the repetition frequency for registering of the sequence of first measured values amounts to, for example, 50 Hz. The second measuring device 3, which is operated in the burst-mode, has, for example, a repetition frequency for providing measured values of about 2 Hz.

The first and second devices can be pressure measuring devices, wherein the first device determines a pressure difference based on the pressure measurement values. Details of the communication of the devices with one another and with the control system will now be explained with reference to FIGS. 1 to 3.

Figure 2:
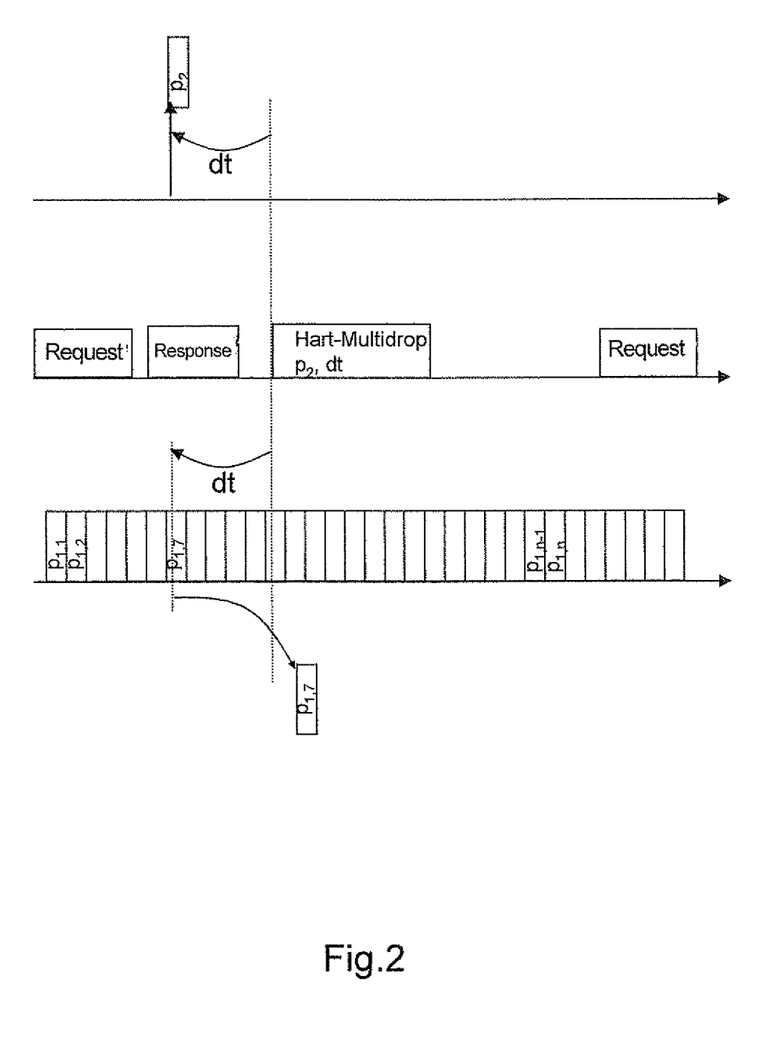
FIG. 2 is a time graph of a first example of an embodiment of the method of the invention.

The three, parallel, time axes shown in FIG. 2 represent, from top down, events, which occur, respectively, in the second measuring device, on the two wire loop, and in the first measuring device. Device 2 operates in the burst-mode, which means that it is able to output measured values cyclically, for example, about every 500 ms. Device 1 operates in the standard mode. It ascertains a measured value, for instance, every 20 ms, wherein the sequence of measured values $p_{1,i}$, with i 1, 2, . . . N, are stored on a revolving basis in a ring buffer. The ring buffer can hold available, for example, at least the 25 most recent measured values provide.

The HART communication on the two wire loop comprises, in this example of an embodiment, a repeating sequence of three elements, of which the first is a request from the control unit for output of a value of the measured variable, whereupon the first measuring device, which ascertains the measured variable, outputs the most recent, earlier calculated value of the measured variable as response. After output of the response by the first measuring device, there follows the time window, in which the first device is ready to receive a value of the second auxiliary measured variable provided by the second measuring device in a HART multidrop frame, wherein the frame supplementally contains time information concerning the delay time between registering of the value of the second auxiliary measured variable and the providing of the value, wherein the beginning of the HART multidrop frame is utilized as synchronization point for the providing.

The first measuring device can, based on the beginning of the HART multidrop frame and the time information, select from the ring buffer an appropriately timed value of the first auxiliary measured variable and, with the provided value of the second auxiliary measured variable as well as the selected value of the first auxiliary measured variable, calculate a value of the measured variable, which is then output as response on the next request from the control system. In the illustrated example of an embodiment, the value $p_{1,7}$ is selected as the value with the suitable time, in order, therewith, for example, to determine a pressure difference $dp=p_{1,7}-p_2$ and to output such as response on the next request.

To the extent that the delay time dt between registering of a value of the second auxiliary measured variable and its output is constant and known, the value of the delay time need not be transmitted in each multidrop frame. It can instead, for example, be transmitted once upon the initializing of the measuring devices and, in given cases, validated at greater time intervals.

Figure 3:
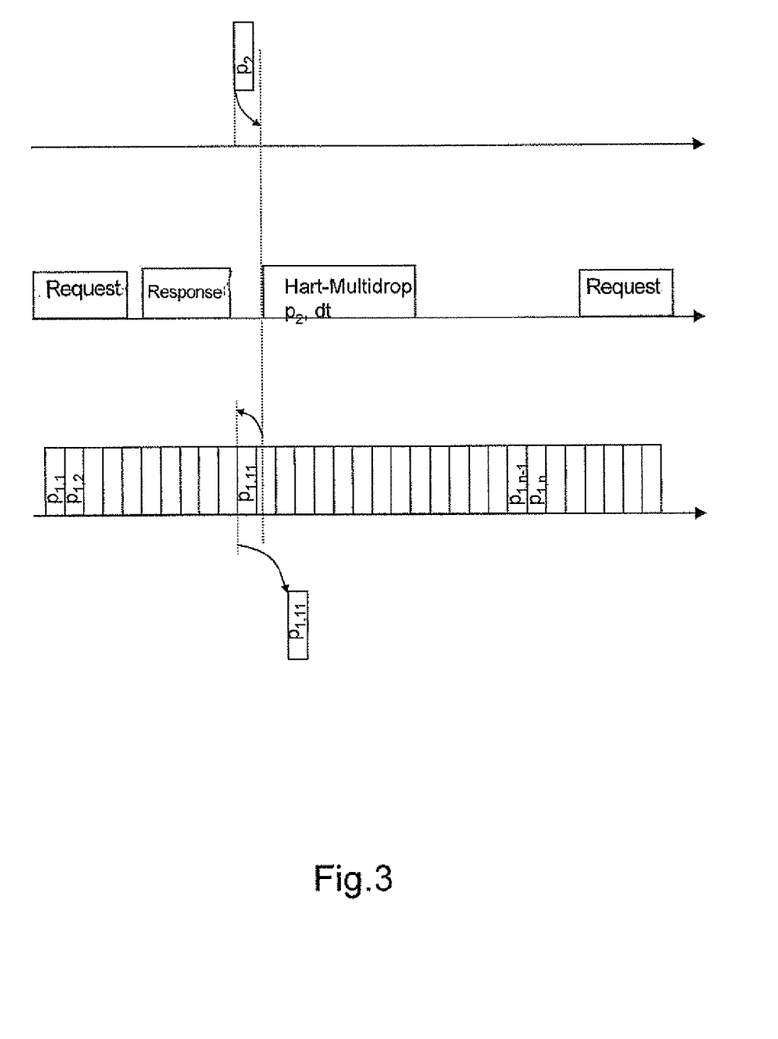
FIG. 3 is a time graph of a second example of an embodiment of the method of the invention.

FIG. 3 shows a simplified form of this method, which is appropriate, when the delay time between registering of a value of the second auxiliary measured variable and the providing of the value in a HART multidrop frame is less than a sampling time interval of the first measuring device. In this case, the applied time information is based on the assumption that the said delay time of the second device is smaller than a sampling time interval of the first measuring device. On the basis of this time information, the first device then uses the most recently available value of the first auxiliary measured variable after detecting the beginning a HART multidrop frame, in order to calculate with this and the provided value of the second auxiliary measured variable a value of the measured variable, which then is output as response upon the next request of the control system. In this example of an embodiment, the value $p_{1,11}$ is selected as appropriate in time, in order therewith, for example, to determine a pressure difference $dp=p_{1,11}-p_2$ and to output such as response upon the next request.

Figure 4:
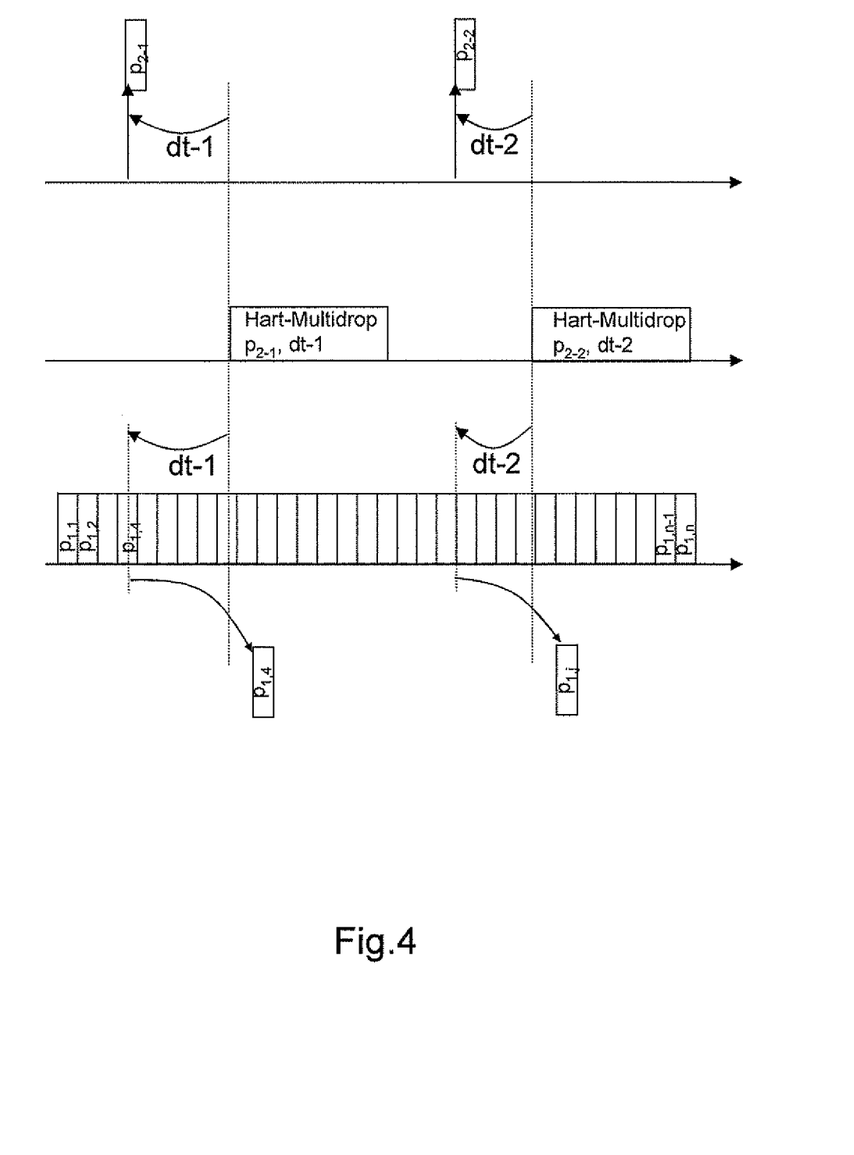
FIG. 4 is a time graph of a third example of an embodiment of the method of the invention.

In the case of the example of an embodiment shown in FIG. 4, a first measuring device and a second measuring device are operated on an electrical current loop, wherein the first measuring device outputs the value of the measured variable as an electrical current level of the two wire loop. The first measuring device receives in the HART protocol a current value of the second auxiliary measured variable with time information in a HART multidrop frame, which is provided by the second measuring device, wherein the time information is here the delay time dt-1, dt-2 between the registering and the providing of the value in the multidrop frame. Based on the time information, the first device selects a value from the sequence of measured values in its ring buffer, whose registering point in time has the smallest time deviation relative to the point in time of the registering of the value of the second auxiliary measured variable, Based on the values of the two auxiliary measured variables, a value of the measured variable is calculated and output as an electrical current signal on the two wire loop. In the illustrated example of an embodiment, first of all, the value $p_{1,4}$ is selected as appropriately timed based on the delay time dt-1 transmitted in the multidrop frame, in order, therewith, to determine, for example, a pressure difference $dp=p_{1,4}-p_{2-1}$ and to output such as electrical an current signal. For the next calculating of the pressure difference, the value $p_{1,j}$ of the first auxiliary measured variable is selected as timed appropriately for $p_{2-2}$ based on the delay time dt-2, in order to determine the pressure difference $dp=p_{1,j}-p_{2-2}$.

Figure 5:
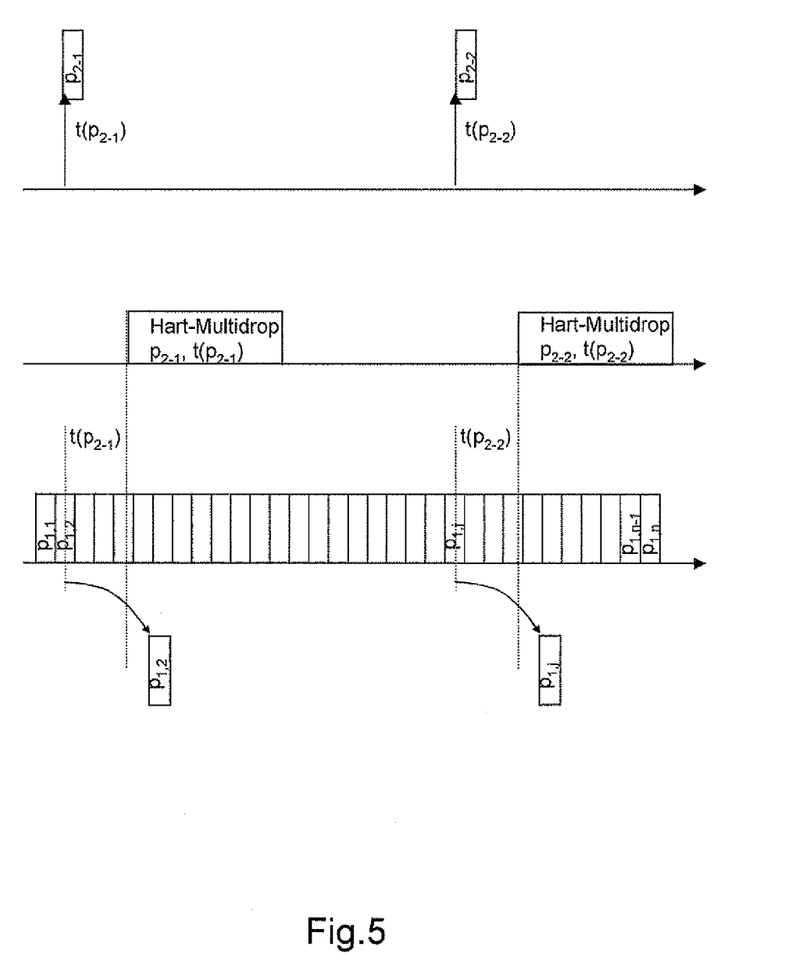
FIG. 5 is a time graph of a fourth example of an embodiment of the method of the invention.

Also in the case of the example of an embodiment shown in FIG. 5, a first measuring device and a second measuring device are operated on an electrical current loop, wherein the first measuring device outputs the value of the measured variable as an electrical current level on the two wire loop. The second measuring device transmits, periodically, current values of the second auxiliary measured variable, in each case, with time information in a HART multidrop frame, wherein the time information here is the point in time of the registering of the respective value $p_{2-1}$, $p_{2-2}$ of the second auxiliary measured variable in the system time of the second measuring device. The system time of the second measuring device is preferably synchronized with the system time of the first measuring device. Based on the time information $t(p_{2-1})$, $t(p_{2-2})$, the first device selects a value $p_{1,2}$, $p_{1,j,\ respectively}$, from the sequence of measured values in its ring buffer, whose point in time of registering has the least time deviation relative to the point in time of the registering of the value of the second auxiliary measured variable. Based on the values of the two auxiliary measured variables, then, in each case, a current value of the measured variable is calculated and output as electrical current signal on the two wire loop. In the illustrated example of an embodiment, these are, for example, the pressure difference values $dp_1=p_{1,2}-p_{2-1}$, and $dp_2=p_{1,j}-p_{2-2}$.

Of course, the concept of time information as system time of the registering of the value of the second auxiliary measured variable can also be used in methods, in the case of which the measuring devices are not connected for tandem operation, but, instead, are controlled by a control unit, upon whose request they react, as such is the case in the first and second examples of embodiments.

The invention claimed is:

1. A method for determining a value of a measured variable, which is a function of a first auxiliary measured variable and at least a second auxiliary measured variable, comprising the steps of:
   registering and providing a sequence of measured values of the first auxiliary measured variable over at least a first time range;
   providing a value of the second auxiliary measured variable, wherein the point in time of registering the provided value lies in the first time range;
   selecting a value of the first auxiliary measured variable from the sequence of measured values of the first auxiliary measured variable as a function of information concerning point in time of registering the provided value of the second auxiliary measured variable; and
   ascertaining a value of the measured variable as a function of the selected value of the first auxiliary measured variable and the value of the second auxiliary measured variable;
   wherein repetition frequency of the registering of the sequence of values of the first auxiliary measured variable is a function of a clock signal of the first measuring device;
   the clocking frequency of the first measuring device is variable in a range of variation of no more than 10%; and
   by variation of the clocking frequency the repetition frequency for registering the values of the first auxiliary measured variable is varied, in order to minimize a deviation between the point in time of the registering of the value of the first auxiliary measured variable to be selected in each case and the point in time of registering the provided value of the second auxiliary measured variable.

2. The method as claimed in claim 1, wherein:
providing of the value of the second auxiliary measured variable occurs upon a demand that the value be provided.

3. The method as claimed in claim 2, wherein:
the registering of the value of the second auxiliary measured variable to be provided occurs upon the demand that the value be provided.

4. The method as claimed in claim 2, wherein:
a sequence of values of the second auxiliary measured variable is registered; and
upon demand that a value of the second auxiliary measured variable be provided, the most up-to-date, available registered value of the sequence is provided.

5. The method as claimed in claim 1, wherein:
the value of the second auxiliary measured variable is provided together with information concerning point in time of registering the provided value of the second auxiliary measured variable.

6. The method as claimed in claim 5, wherein:
there is transmitted, together with the value of the second auxiliary measured variable, the value of a delay time, which has passed between registering of the value of the second auxiliary measured variable and the providing of the value of the second auxiliary measured variable.

7. The method as claimed in claim 1, wherein:
based on point in time of receipt of a data frame, with which the value of the second auxiliary measured variable is provided, and based on a delay time between registering of the value of the second auxiliary measured variable and the providing of the data frame, the point in time of the registering of the value of the second auxiliary measured variable is ascertained.

8. The method as claimed in claim 5, wherein:
there is provided with the value of the second auxiliary measured variable a time signal, which expresses the point in time of the registering according to a system time of a measuring device, which registers and provides the value of the second auxiliary measured variable.

9. Method as claimed in claim 8, wherein:
the system time of the second measuring device is synchronized with the system time of a first measuring device, which registers the sequence of values of the first auxiliary measured variable.

10. The method as claimed in claim 9, wherein:
the synchronizing occurs by having the first measuring device request the system time of the second measuring device, which then transmits its system time to the first measuring device, and the first measuring device compares the system time of the second measuring device with its own system time and transmits a correction value for the system time of the second device to the second device, wherein the second measuring device corrects its system time using the transmitted correction value.

11. The method as claimed in claim 1, wherein:
the provided values of the sequence of values of the first auxiliary measured variable are stored in a ring buffer.

12. The method as claimed in claim 1, wherein:
the values of the first auxiliary measured variable are registered by a first measuring device;
the values of the second auxiliary measured variable are registered by a second measuring device;

the first and the second field devices are connected with one another via a digital data communication means, and wherein the first measuring device is operated as master; and the second measuring device is operated as slave.

13. The method as claimed in claim 12, wherein:

the first measuring device and the second measuring device communicate with one another via a HART protocol.

14. The method as claimed in claim 13, wherein:

the second measuring device provides the value of the second auxiliary measured variable in a HART multi-drop frame.

15. The method as claimed in claim 1, wherein:

the measured variable is furthermore a function of at least a third auxiliary measured variable, wherein a sequence of values of the third auxiliary measured variable is provided and a value of the third auxiliary measured variable enters into the ascertaining of a value of the measured variable.

16. The method as claimed in claim 15, wherein:

the sequence of values of the third auxiliary measured variable is provided with information concerning respective points in time of the registering of the values.

17. The method as claimed in claim 1, wherein:

the clocking frequency of the first measuring device is variable in a range of variation of no more than 5%.

* * * * *